Oct. 24, 1967    L. THORINGTON    3,349,339
OPTICALLY PUMPED LASER WITH CATHODO-LUMINESCENT
PUMPING LIGHT SOURCE
Filed May 23, 1966    2 Sheets-Sheet 1

INVENTOR
LUKE THORINGTON
BY Darby & Darby
ATTORNEYS

Oct. 24, 1967  L. THORINGTON  3,349,339
OPTICALLY PUMPED LASER WITH CATHODO-LUMINESCENT
PUMPING LIGHT SOURCE
Filed May 23, 1966  2 Sheets-Sheet 2

INVENTOR
LUKE THORINGTON
BY *Darby & Darby*
ATTORNEYS

United States Patent Office 3,349,339
Patented Oct. 24, 1967

3,349,339
OPTICALLY PUMPED LASER WITH CATHODO-
LUMINESCENT PUMPING LIGHT SOURCE
Luke Thorington, Berkeley Heights, N.J., assignor to
Duro-Test Corporation, North Bergen, N.J., a corporation of New York
Filed May 23, 1966, Ser. No. 562,025
12 Claims. (Cl. 331—94.5)

This application is a continuation-in-part of my copending application Ser. No. 159,080, filed Dec. 13, 1961, now abandoned.

The invention relates to amplifiers or oscillators utilizing the principle of stimulated emission of radiation, commonly known as lasers, and particularly such devices which are optically pumped by light emitted from a luminescent material.

Optically pumped lasers have previously been proposed wherein pumping light was produced by a gaseous discharge lamp; such apparatus is disclosed, for example, in Patent No. 2,929,922 to Schawlow and Townes. Numerous lasers have been built utilizing a ruby crystal as the laser working medium and a xenon gaseous discharge lamp for the pumping light source. Such apparatus have been subject to the difficulty that continuous pumping light was not obtainable due to the fact that the light intensity required from the xenon lamp causes generation of a great deal of heat which would melt even a quartz envelope xenon lamp if the lamp were continuously operated at this high power. In addition to the adverse effect of heat on the pumping light source, an adverse effect is also produced on the ruby or other laser working medium.

The present invention provides a pumping light for optically pumped lasers which produces a very high intensity of light within a relatively narrow range of wavelength and relatively little radiation outside this wavelength range which would tend to be wasteful of power and to heat the laser working medium. The light source of the present invention is a reflective and luminescent layer comprising a cathodo-luminescent material excited to luminescence by a stream of high energy electrons.

In addition to providing the above described features and advantages, it is an object of the present invention to provide optically pumped laser apparatus with a pumping light source in the form of a distributed reflective surface comprising a cathodo-luminescent material.

It is still another object of the present invention to provide such apparatus wherein the pumping light source is a cathodo-luminescent layer excited by electrons emitted from a cold cathode electron emitter.

It is still another object of the present invention to provide optically pumped laser apparatus wherein the pumping light source is a cathodo-luminescent material excited by streams of the electrons generated by electron guns including thermionic electron emitters.

It is a still further object of the present invention to provide apparatus of the foregoing type including means for circulating a coolant about the laser working medium to allow low temperature operation thereof.

Other objects and advantages will be apparent from a consideration of the following description in conjunction with the appended drawing, in which.

Figure 1:
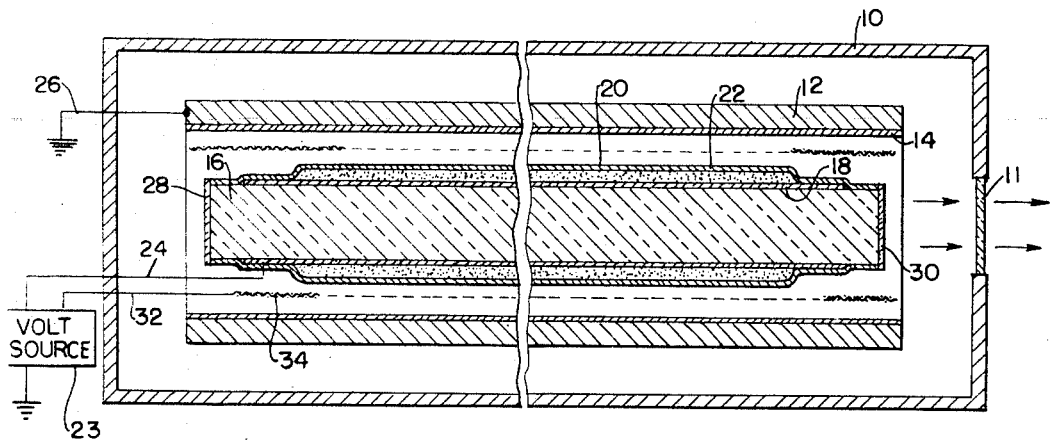
FIGURE 1 is a vertical sectional view partially schematic in form of laser apparatus according to the present invention.

Referring now to FIGURE 1, the apparatus is provided with an envelope 10 having a light transmitting window 11 which may be of glass and usually will be optically ground to prevent distortion of the light beam transmitted therethrough. The size and shape of the envelope 10 is not critical and it may take any convenient shape, preferably one to support the evacuated interior against the pressure of the atmosphere. The interior of enclosure 11 is evacuated in accordance with the usual techinque employed in the production of electron space discharge devices.

As illustrated in FIGURE 1, a cathode 12 is provided comprising a body of suitable metal which may be nickel, a nickel plated metal such as iron, or may be a sheet of glass or ceramic material having a nickel coating. In FIGURE 1 the cathode 12 is in the form of a cylinder but it may of course take other forms such as a set of flat plates. It is of course advantageous for the cathode to substantially surround the other internal structure.

The interior surface of the cathode body 12 is coated at 14 with a magnesium oxide film to form a cold cathode electron emitter. In a case where the body 12 of the cathode is a non-conducting material it may first be provided with a thin coating of a conductive material such as nickel before the magnesium oxide coating 14 is applied.

The magnesium oxide coating described is given as an illustration of a form of cold cathode material. The construction and operation of cold cathodes is well known in the art and will not be described here. It should be pointed out that the illustrations are not intended to represent the thickness of various layers proportionally, but rather in most cases the thickness is exaggerated for the purpose of illustration. It may be noted that the coating 14 of magnesium oxide may have a thickness of 100 to 1000 microns.

As is well known, such cold cathodes are rendered active by providing a collector electrode facing the magnesium oxide film and maintained at a positive potential of from 200 to 300 volts with respect to cathode body 12 or the conducting coating underlying the magnesium oxide coating 14 in the case of a non-conducting body. The collector electrode potential creates a high intensity electric field across the thin magnesium oxide layer and when the magnesium oxide film is charged to the collector potential it starts and continues to emit electrons. The oxide may be charged for starting by light, by the discharge of a Tesla coil or by a radioactive source. Some cold cathode devices use in conjunction with the collector electrode an incandescent filament to aid in the starting of the electron emission. The particular form of starting device used in connection with FIGURE 1 is not pertinent to the present invention, and thus any of the foregoing described starting elements may be used. For example, a radio active material may be applied to the screen grid 34 to facilitate starting. Alternatively the device may be arranged to incorporate an electro-luminescent light source for starting purposes as described in Patent No. 2,955,221 for Cold Cathode Light Source.

The electron emission from a cold cathode may be controlled by varying the collector voltage and currents from a few micro-amperes to several tens of milli-amperes per square centimeter may be obtained. In general, the current changes exponentially with collector voltage.

It will be understood that the electrons which are emitted as previously explained from the cathode material 14 will be directed inwardly from the cylindrical cathode body 12.

Placed centrally within the cylindrical cathode body 12 is an elongated body of solid laser material 16. This material may be a ruby crystal. The use of ruby crystal as laser material is well known in the art and will not be explained in detail here.

The laser material 16 is provided with a thin transparent coating which is electrically conductive, such coatings are well known in the art and may be formed of tin oxide, for example. In some cases the thin coating 18 may not be adequate to carry the considerable electrical currents which must be accommodated and in such case heavy silver strips may be bonded to the conductive layer 18 to form bus bars running longitudinally of the laser material 16.

Deposited on the exposed face of the transparent layer 18 is a coating of luminescent material 20. Numerous examples of suitable luminescent materials will be given hereinafter but it will suffice for the present to give as an illustration zinc silicate and manganese phosphor, which emits a relatively narrow spectral band of light in the green part of the visible spectrum. It should be noted that the phosphor is selected to emit light of a wavelength which is efficient for pumping the laser material. Ruby laser material is efficiently pumped by light of 5600 Angstroms. The emission of zinc silicate: manganese phosphor is centered near the 5600 Angstrom portion of the visible spectrum.

The luminescent material 20 may be enclosed within a highly reflective aluminum coating 22, extending around the laser material 16. The aluminum coating 22 is sufficiently thin to allow penetration of the high energy electrons but is sufficiently thick to be highly reflective and thus serves to direct the light emitted by phosphor 20 into the laser material 16. The formation and use of such aluminum coatings to intensify the output from phosphor coatings is well known in the art and will not be explained in detail here. The aluminum coating is optional and not an essential feature of the invention. The thickness of the luminescent material 20 may be optimized based on the electron energy, presence or absence of aluminum coating, etc., by procedures well known in the art, of cathode ray tube design, for example.

A voltage source 23 is provided to establish the desired potential difference between the cathode body 12 and the transparent layer 18 serving as an anode. This potential difference will be a minimum of 200 to 300 volts and may be as high as 25,000 volts. The voltage source 23 has a high-voltage lead 24, connecting to the transparent layer 18. When potentials on the order of thousands of volts are utilized, it may be necessary to provide a screen grid 34 between the cathode and the anode having a potential of approximately 200 to 300 volts with respect to the cathode body 12 in order to prevent the breakdown of the cathode material 14 due to excessive electric field and excessive currents. The screen grid 34 may be connected to a relatively low voltage terminal of voltage source 23 by means of a lead 32.

It will be appreciated that the voltage source 23, leads 32, 24 and ground lead 26 are all illustrated schematically and that the construction and arrangement of these elements may be provided in various ways, all of which are well known in the art.

It may be noted that the current emitted from cathode material 14 is substantially controlled by the voltage applied to screen grid 34, while the energy or velocity of the electrons impinging on the luminescent material 20 is substantially controlled by the potential difference applied to transparent anode layer 18 through electric lead 24. Accelerating the electrons to higher energies is generally desirable as this increases the efficiency of light production from the luminescent material 20; high energies also facilitate penetration of the electrons through reflective layer 22.

As is well known in the art, the ruby rod 16 forming the laser working medium is preferably highly polished to optical flatness on both ends and provided thereon with reflective layers 28 and 30. The reflective layers 28 and 30 may be metallic or may be of the multi-layer interference type. The latter type layer is frequently preferred due to the very low percentage of light loss which may be thereby provided. The multi-layer interference reflectors are also preferred by virtue of their ability to handle higher intensities of light without destruction of the reflecting surface.

Reflecting layer 28 may be totally reflective (or as nearly so as may be arranged) while reflector layer 30 is preferably partially transparent, on the order of 5% for example.

The operation of laser devices and particularly ruby laser devices is well known and will not be explained in detail here. However, it may be useful to summarize briefly the operation of the overall apparatus of FIGURE 1. A stream of electrons is emitted from cold cathode material 14 and accelerated toward transparent anode layer 18 by virtue of the electric field established by voltage source 23. Some starting mechanism is generally required for the cold cathode emission operation and the screen grid 34 may be coated with a small amount of radio active material to provide a source of starting energy. Other starting arrangements may be provided as previously explained.

Electrons emitted from the cathode material 14 strike the aluminum reflecting layer 22 with high velocity and penetrate this layer to impinge upon the luminescent material 20. The luminescent material 20 is thereby excited to emit light which is directed into the laser material 16 by layer 22. This light is a frequency which efficiently pumps the laser material 16. The zinc silicate: manganese phosphor is highly reflective to the light which it emits, so that pumping light not absorbed in a first pass through the laser material 16 is reflected back into the material rather than being lost. To the extent that a phosphor layer is partially transparent, the reflecting layer 22 may be relied upon to reflect unabsorbed pumping light back into laser material 16. None of the phosphors herein proposed is absorptive of the pumping light wavelength.

The effect of the pumping light is to raise chromium ions in the ruby laser material 16 to particular discrete energy levels to create in the laser medium a condition generally described as a population inversion. This condition is such that a higher of two energy levels is more densely populated than the lower of the levels so that the material is readily stimulated to emit light of a frequency corresponding to the energy difference between the two levels. This frequency is not necessarily the same as the frequency of the pumping light and in the specific example presented here may be one of several wavelengths between approximately 6900 Angstroms and 7050 Angstroms (as a specific example 6943 Angstroms).

The energized laser material is stimulated to emit such light by the light photons which are partially trapped between reflector 28 and reflector 30 and thus traverse and retraverse the laser medium 16. Light photons released by the stimulated emission of radiation are coherent in space and time with the stimulating radiation and thus they build up coherent light oscillations between reflectors 28 and 30. A portion of this oscillating light energy escapes through partially transmissive reflective layer 30.

The previous explanation of the laser operation is of course greatly simplified but is sufficient for the present purpose in view of the extensive knowledge of such operation in the art and obtainable from the published literature.

It will be noted that the apparatus of FIGURE 1 produces pumping light for the laser operation with a high intensity and particularly a high intensity in the region of the spectrum most efficient for pumping the laser material 16. The effect therefore is to produce a high intensity of light for pumping purposes within the laser material 16 with a minimum amount of heating of the material. It should be noted that the cold cathode emission from cathode material 14 as well as the conversion of electron kinetic velocity to light energy in the luminous material 20 are both accompanied by far lesser degrees of heat generation than comparable light producing phenomena.

It will be understood that the specific apparatus illustrated in FIGURE 1 is subject to numerous variations within the scope of this invention. It should particularly be noted that numerous different laser materials may be substituted for the ruby crystal 16. It should be pointed out that materials which are susceptible of being pumped to conditions wherein population inversions previously mentioned are present will be referred to generally hereinafter as "optically pumpable negative temperature materials." "Negative temperature" is a term that is frequently applied to population inversions as previously described.

It should also be noted that lasers or masers are capable of use as amplifiers as well as oscillators. In such a case a signal would be fed through a laser material which was insufficiently energized to oscillate and such signal would be amplified by the stimulated emission of radiation. The apparatus of FIGURE 1 is not shown as conveniently adaptable for use as an amplifier since it has only the one window 11 provided for an output. Alternative embodiments of the invention will be described which are arranged for possible use as an amplifier as well as an oscillator.

In view of this dual character of laser apparatus whereby it may be utilized either as an amplifier or an oscillator, the term "intensification" will hereinafter be utilized in the description and claims to include either the function of oscillation, that is generation, or amplification or any combination thereof.

Figure 2:
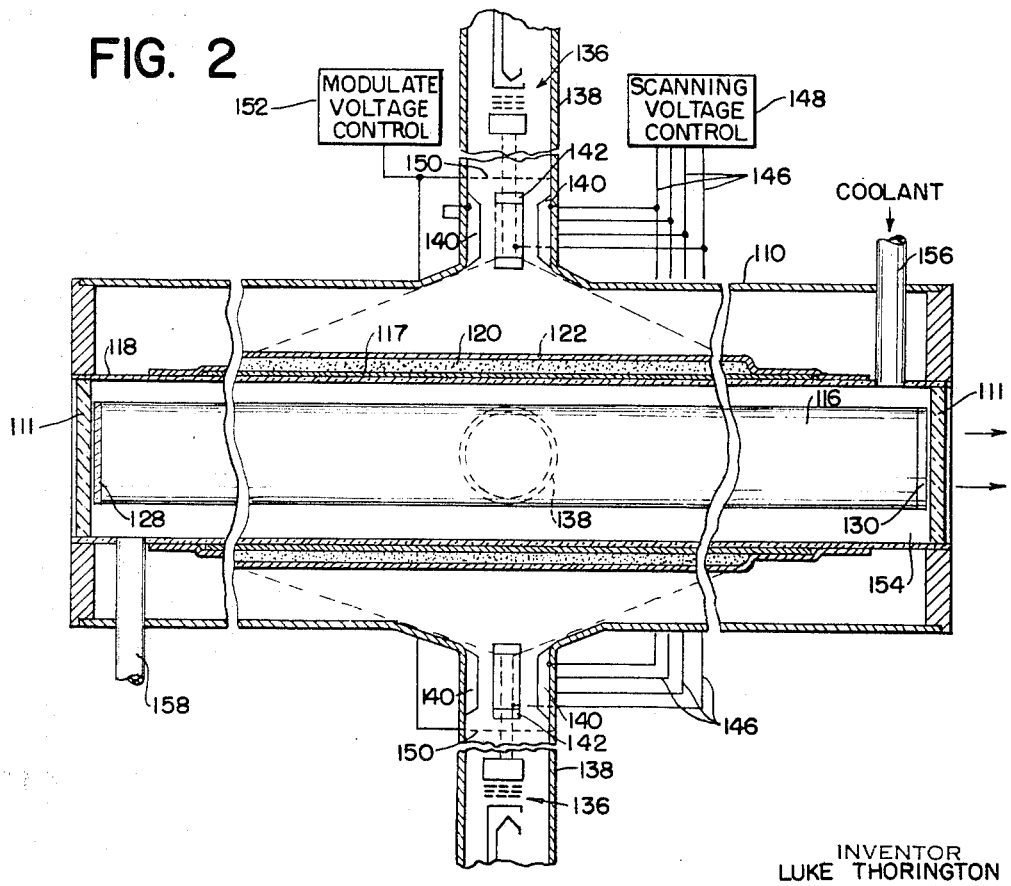
FIGURE 2 is a vertical sectional, partially schematic, view of an alternative embodiment of the invention.

FIGURE 2 shows an alternative embodiment of the present invention arranged to provide for forced cooling and utilizing beam excitation rather than flooding of the luminescent material.

An envelope 110 is provided which is evacuated. The envelope may be of metal. The envelope 110 is provided with two windows 111 located in the ends thereof. While the shape of the envelope 110 is not critical it may be conveniently made in cylindrical shape.

An enclosure 118 is provided within the envelope 110 within which there is situated the laser material 116 which may, as in the case of FIGURE 1, be a ruby rod. The ruby rod 116 may be supported within the enclosure 118 in any suitable fashion preferably in a manner to minimize the obstruction to coolant flow.

It will be noted that the enclosure 118 serves to provide a volume 154 about the laser material 116 for the passage of coolant which is separated from the remainder of the volume of envelope 110.

The cylinder 118 may be formed of glass, quartz or other transparent material and is provided with a conductive transparent layer 117 which serves as a collector electrode for the electron beam, later to be described. A thin layer of luminous material 120 is coated on the transparent conductive layer 117 and a reflective aluminum layer 122 may be applied over the luminescent material 120. The construction and operation of these elements will be generally similar to that described in FIGURE 1.

The laser material 116 is provided with reflective layers 128 and 130 which may correspond to layers 28 and 30 in FIGURE 1. In FIGURE 2, however, windows are provided at both ends of the envelope 110 so that both reflector layers 128 and 130 may be made partially transmissive if desired to obtain outputs from both ends of the ruby rod 116. The two windows 111 also allow the laser apparatus to be utilized as an amplifier in a manner known in the art and described for example in the Proceedings of the Institute of Radio Engineers for November 1961, pages 1635 to 1639. Such an amplifier may be of resonant type where partially reflective layers 128 and 130 are provided, or alternatively these layers may be eliminated so that the light makes a single pass through the ruby crystal 116 and the amplifier will thus have no dimension-dependent resonance.

In the apparatus of FIGURE 2, excitation of the luminescent material 120 is provided by simple but effective apparatus analogous to that contained in the ordinary television picture tube.

Four cylindrical necks 138 are provided around the envelope 110 in which there are placed respective electron beam guns 136. The construction of electron beam guns is well known in the electron tube art and will not be discussed in detail here.

Electrostatic deflection plates 140 and 142 are arranged in the respective cylindrical necks 138, so that the electron beam from the gun 136 may be directed to scan the cylindrical surface of the luminescent material 120. It will be noted that four guns are provided so that each gun is required to scan only approximately a 90-degree sector of the cylindrical layer of luminescent material 120. It will be appreciated of course that a greater or lesser number of electron beam guns may be provided. The deflection plates 140 and 142 are connected by leads 146 to a scanning voltage control shown in block form at 148. The scanning voltage control causes the electron beam to scan over an area of substantially rectangular shape. As is well known in the cathode ray tube art, such scanning can be accomplished at very high speed and if desired the scanning may be sufficiently rapid compared with the persistence of the phosphor layer 120, so that substantially continuous production of light is obtained from the layer 120.

In some cases it may be desired to modulate the intensity of the electron beam in addition to scanning it over the area of luminescent material and for this purpose that are provided control grids 150 in each of the cylindrical necks 138. These control grids are supplied with a suitable control voltage from a modulation voltage control 152.

It will be appreciated that conventional power supplies will be required for the electron beam guns 136 which have been omitted for the sake of simplicity.

It will be noted that a principal difference in alternative form of device illustrated in FIGURE 2 is the provision of a cooling space 154 around the laser material 116 together with input and output conduits 156 and 158 for the circulation of a coolant through the coolant space 154. For some purposes forced air coolant will be adequate to achieve the desired operation of the laser apparatus. However, the apparatus of FIGURE 2 may be operated at very low temperature by utilizing liquid nitrogen or even lower temperature coolants. It is well known that the use of lower temperatures enhances laser apparatus operation in various respects, particularly in the reduction of unwanted "noise" in the light output.

It should further be noted that the coolant circulation provided in the apparatus of FIGURE 2 serves to cool the luminescent material 120 and to carry away the unavoidable heat produced by the impingement of the electron beams. This further increases the intensity to which the luminescent material 120 can be excited without overheating.

A further modification to FIGURE 2 where light or penetrating radiation is utilized to excite the luminescent material 120 may be accomplished by using a liquid luminescent material as a circulating coolant. In such a case elements 117, 120 and 122 would be eliminated. A naturally liquid luminescent material may be used or a luminescent solution or a finely divided suspension of one of the solid luminescent materials described herein.

Figure 3:
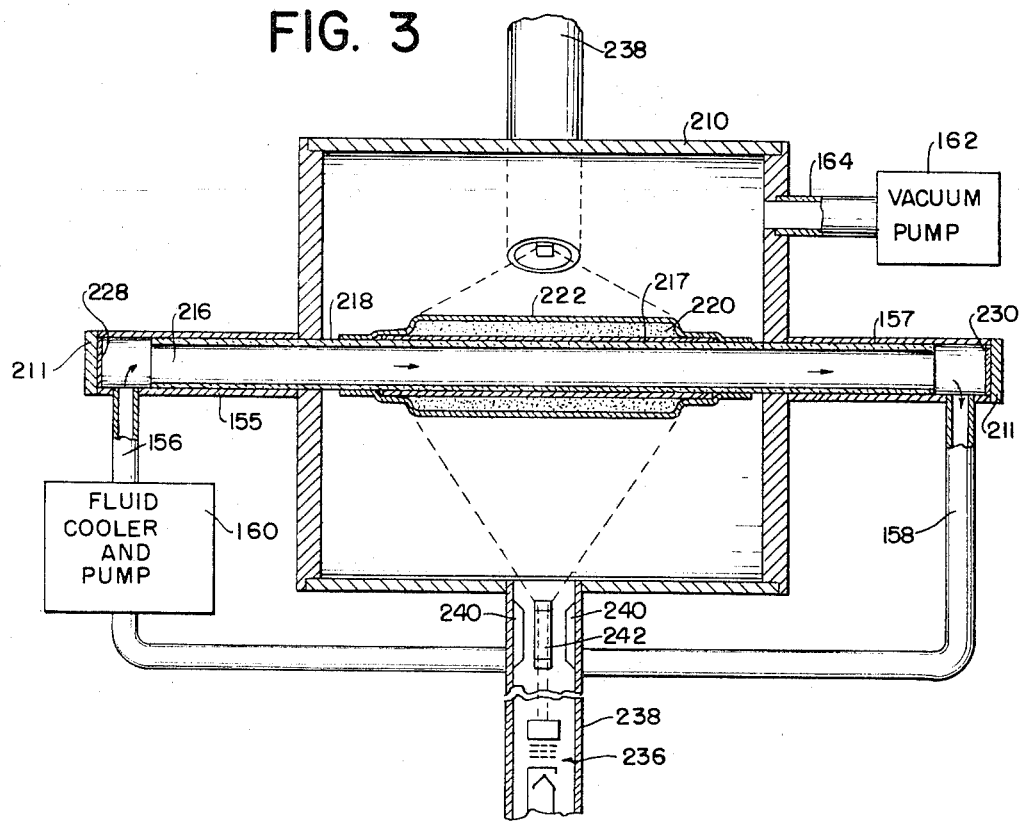
FIGURE 3 is a vertical sectional, partially schematic view of a second alternative embodiment of the invention.

The apparatus of FIGURE 3 is generally similar to that of FIGURE 2, except that the laser material, that is, the optically pumpable negative temperature material, is a liquid and is circulated through the apparatus in place of the coolant fluid of FIGURE 2.

In the apparatus of FIGURE 3 an envelope 210 is provided which may comprise a metal cylinder. The envelope 210 is evacuated by a vacuum pump 162 connected to the envelope by a conduit 164. Of course, the envelope may alternatively be evacuated and sealed off if desired. An enclosure 218 is provided which extends through the envelope 210 within which is contained the laser fluid 216.

Enclosure 218 at least within the envelope 210 is formed of transparent material such as glass or quartz. End caps 155 and 157 are connected to the enclosure 218 and these are in turn connected to conduits 156 and 158 for the circulation of the fluid laser medium through enclosure 218. The fluid is circulated and cooled by the fluid cooler and pump 160 illustrated schematically. Windows 211 are provided on the ends of the enclosure 218 and reflective layers 228 and 230 are provided corresponding to those described for previous embodiments.

The light source for the apparatus of FIGURE 3 corresponds generally to that illustrated for FIGURE 2. A transparent conductive layer 217 is provided upon which there is a coating of luminescent material 220 and a reflective aluminum layer 222. Electron guns 236 are provided in elongated cylindrical necks 238 opening into the envelope 210. Electro-static deflection plate 240 and 242 are provided for scanning the luminescent material. The apparatus of FIGURE 3 is provided with three electron guns rather than four as illustrated in FIGURE 2.

It should be noted that while apparatus has been described for generating a small diameter beam which is than scanned over the surface of the luminescent material 220, it may in some cases be desired to use an electron gun which does not focus to a sharp beam but which rather floods a large area of the luminescent materials thus doing away with the scanning requirement.

In FIGURE 3 the scanning and modulation control apparatus has been omitted for simplicity but it will be understood that apparatus similar to that of FIGURE 2 may be utilized.

It will generally be preferred that the laser material 216 in FIGURE 3 be in liquid form in order that the specific heat and thus the cooling ability of the material will be maximized. A suitable liquid laser material is $Eu_2(SO_4)_3 \cdot 8H_2O$ dispersed in ethyl alcohol; further examples are given in Table I below. In some cases, however, the apparatus of FIGURE 3 will be useful for use with a gaseous laser material (e.g., a helium-neon mixture).

Generally, liquid laser working media may be of two principal types, the first being one in which rare earth ions are dispersed in a suitable solvent, such as water, alcohol, etc., in which the solvent can actually affect the absorption and emission characteristics of the solute. The second type of media utilizes conventional laser materials such as ruby, $CaF_2$:Sm, etc. in the form of small crystallites dispersed in a clear (to wavelengths involved) media of substantially the same index of refraction as the laser crystals and preferably of about the same specific gravity.

It should be recognized that the system of crystallites in suspension has a tremendous advantage over present techniques in that it allows the use of many materials which are laser sensitive but which cannot be grown in sufficiently large crystals to be used in the conventional manner. Isotropic crystals, such as for example the rare earth activated calcium fluoride which is cubic in crystalline habit, would be particularly effective in such a liquid system. An additional advantage with this system lies in the fact that each tiny crystallite is surrounded by a coolant, thus making possible the maintenance of a more uniform crystal temperature in a laser material—one of the biggest problems with present single crystal systems. As already described, it is of course possible to recirculate such a slurry or suspension and cool it externally.

In all cases the luminescent material 220 is selected to provide a pumping light having a spectral characteristic matching that of the pumping requirement of the laser material. In the case of FIGURE 3, specifically the luminescent material 220 may comprise:

Hex. _____ ZnS:Ag.
Rbhdl _____ $Zn_8BeSi_5O_{19}$:Mn.
Tetr. _____ $CaWO_4$:(W).
or
Cub. _____ ZnS:Cu.

Luminescent material for other liquid mediums may be selected by reference to pump wavelengths in Table I.

It may be noted that the apparatus of FIGURE 3 like that of FIGURE 2 is adaptable to use as either an amplifier or an oscillator.

TABLE I.—LIQUID LASER MEDIA

| Compound | Solvent | Concentration | Pump Wavelength, A |
|---|---|---|---|
| $Gd_2(SO_4)_3$ | Water | $10^{-4}$–$10^{-3}$ molar | 2,700–3,060 |
| $Eu_2(SO_4)_3 \cdot 8H_2O$ | Ethyl alcohol | do | 4,000–5,500 |
| $CaF_2$:Sm | | 74% Glycerol-water | 3,500–4,000 |
| $CaF_2$:U | | | ~3,650 |
| $BaF_2$:U | | 100% Glycerol | ~3,650 |
| $SrF_2$:Sm | | 77% Glycerol-water | 3,500–4,000 |
| Europium benzoyl-acetonate | Ethanol or n-hexane | | 4,000–6,500 |
| Benzophenone | Ethanol | | 3,000–5,000 |

While the spectral emission characteristics of luminescent materials are well known in the art and likewise the pumping light requirements of laser material are well known or readily ascertained, particular examples of well suited combinations of luminescent materials and solid laser working mediums are given in Table II to illustrate the manner in which the proper light frequency output may be provided by luminescent material to pump the laser working medium with a minimum loss of energy and a minimum generation of unwanted heat.

TABLE II.—PHOSPHORS FOR LASER PUMPING

| Laser Crystal | Excitation Band, A. | Cathodoluminescence Phosphors for Laser Pumping |
|---|---|---|
| $CaWO_4$:Nd | <4,000 | ZnO:Zn or $Ca_3(PO_4)_2$:Ce |
| $CaF_2$:Sm | 3,500–4,000 | ZnO:Zn or $Ca_3(PO_4)_2$:Ce |
| $CaF_2$:U | ~3,650 | $Ca_3(PO_4)_2$:Ce |
| $Al_2O_3$:Cr | 5,600 | $ZnSiO_4$:Mn or MgS:Sb |
| $BaF_2$:U | ~3,650 | $Ca_3(PO_4)_2$:Ce |
| $SrF_2$:Sm | 3,500–4,000 | ZnO:Zn or $Ca_3(PO_4)$:Ce |

Figure 4:
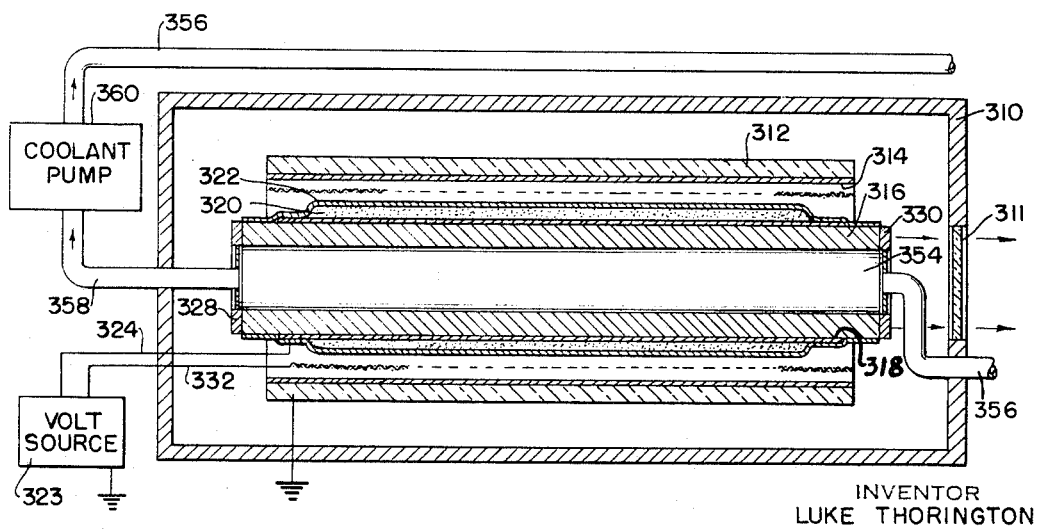
FIGURE 4 is a vertical sectional, partially schematic view of a third alternative embodiment of the invention.

FIGURE 4 illustrates the manner in which the apparatus of FIGURE 1 can readily be adapted to forced cooling.

In FIGURE 4, the structure is generally similar to that of FIGURE 1. An envelope 310 is provided having a window 311 of glass or quartz and otherwise constructed of metal or suitable material for maintaining the interior of the envelope substantially evacuated. A cylindrical cathode body 312 is provided with a layer of cold cathode material 314 such as magnesium-oxide. Centrally located within the cathode 312 is a body of laser material 316 which in the FIGURE 4 apparatus is of toroidal cross-section and provided with an opening 354 longitudinally through the laser material 316 for the passage of a coolant. The reflecting layers 328 and 330 are correspondingly of annular form and otherwise may be similar to reflective layers 28 and 30 described with respect to FIGURE 1.

The laser material 316 is provided with a transparent coating 318 of conductive material as in the apparatus of FIGURE 1. A layer of luminescent material 320 and a reflective aluminum layer 322 are provided also similar to those in FIGURE 1.

A voltage source 323 is connected by leads 324 and 332 to the conductive layer 318 and to a screen grid 334. The voltages provided may be similar to those described for FIGURE 1. A ground connection 326 is provided for cathode body 312. The apparatus of FIGURE 4 differs from that of FIGURE 1 in the provision of forced cooling. This is accomplished by virtue of the opening 354 provided through the laser material 316 and the conduits 356 and 358 passing through the walls of envelope 310 and connected to the central opening 354 in the laser material 316. A suitable coolant which may be forced air, liquid nitrogen or the like as previously described is circulated through the central opening 354 by a coolant pump 360.

It will be appreciated that the structure of FIGURE 4 provides means for passing a large volume of cooling fluid through the center of the laser material 316, which may be ruby crystal for example, in order to stabilize the temperature of the laser medium. This cooling provision in conjunction with the fact that pumping light is provided with generation of a minimum of heat allows the apparatus of FIGURE 4 to be operated at very high energy levels and at relatively low temperatures. In addition to ruby crytals, other solid laser media may be utilized in the apparatus of FIGURES 1, 2 and 4, such as glasses of $Li$-$Mg$-$Al$-$SiO_3$ composition doped with rare earths such as Y, Ho, Nd, or Gd.

From the foregoing description it will be appreciated that the present invention provides laser apparatus which is pumped by a light source of a cathodo-luminescent material which provides the advatnage of very high light intensities with relatively little generation of heat or other unwanted radiation. In particular the luminescent materials may be selected to emit light of a spectral characteristic which is most efficiently utilized by the laser working medium to be employed.

The advantages thus obtained are calculated to overcome previous difficulties encountered in developing high power and/or continuously operating solid state laser devices.

It is apparent that numerous variations and modifications may be made to the particular embodiments illustrated and suggested by those of ordinary skill in the art, and it is accordingly desired that the scope of the present invention not be limited to the particular embodiments shown, described or suggested but that it be limited solely by the appended claims.

What is claimed is:

1. Apparatus for intensification of electromagnetic radiation in a first predetermined wavelength range by stimulated emission of radiation comprising a volume of negative temperature material optically pumpable by light in a second predetermined wavelength range, evacuated containing means for said material, a portion of said containing means being at least partially transparent to radiation in said first predetermined wavelength range, a unitary reflecting layer comprising a cathodo-luminescent material for emitting light in said second predetermined wavelength range adjacent a portion of said volume of negative temperature material with said cathodo-luminescent material being positioned to emit light in said second predetermined wavelength range into said volume portion of negative temperature material, said layer further forming a surface partially surrounding said volume of negative temperature material, whereby light in said second predetermined wavelength range which is not absorbed by said negative temperature medium is reflected back through said medium, there being a path between said cathodo-luminescent material and said volume portion substantially transparent to light of said second predetermined wavelength range, and means for generating a stream of high velocity electrons to impinge on said layer to cause luminescence thereof in said second wavelength range.

2. Apparatus as claimed in claim 1 wherein said electron stream generating means comprises a cold cathode electron emitter.

3. Apparatus as claimed in claim 2 wherein said emitter comprises magnesium oxide.

4. Apparatus as claimed in claim 3 wherein said electron stream generating means comprises an electron beam gun and scanning means.

5. Apparatus as claimed in claim 1 wherein said negative temperature material comprises small crystallites dispersed in a liquid.

6. Apparatus as claimed in claim 5 wherein said crystallites have an index of refraction substantially equal to that of said liquid.

7. Apparatus as claimed in claim 5 wherein said crytallites have a specific gravity approximately equal to that of said liquid.

8. Apparatus as claimed in claim 1 wherein said cathodo-luminescent material is substantially in contact with said negative temperature material.

9. Apparatus for intensification of light in a first predetermined wavelength range by stimulated emission of radiation comprising a volume of negative temperature fluid optically pumpable by light in a second predetermined wavelength range, means enclosing said fluid means for circulating said fluid through said enclosing means, means for cooling said circulating fluid, said enclosing means having a window at least partially transparent to light in said first predetermined wavelength range, a layer of luminescent material emitting light in said second predetermined wavelength range substantially surrounding a portion of said enclosing means, said portion of said enclosing means being substantially transparent to light of said second predetermined wavelength range, an evacuated chamber surrounding said layer of luminescent material and means for generating a stream of high velocity electrons to impinge on said layer to cause luminescence thereof.

10. Apparatus as claimed in claim 9 wherein said electron stream generating means comprises an electron beam gun and scanning means.

11. Apparatus for intensification of light in a first predetermined wavelength range by stimulated emission of radiation comprising a volume of negative temperature material optically pumpable by light in a second predetermined wavelength range dispersed in a liquid, means enclosing said liquid, means for circulating said liquid through said enclosing means, means for cooling said circulating liquid, said enclosing means having a window at least partially transparent to light in said first predetermined wavelength range, a layer of luminescent material emitting light in said second predetermined wavelength range substantially surrounding a portion of said enclosing means, said portion of said enclosing means being substantially transparent to light of said second predetermined wavelength range, an evacuated chamber surrounding said layer of luminescent material and means for generating a stream of high velocity electrons to impinge on said layer to cause luminescence thereof.

12. Apparatus for intensification of light in a first predetermined wavelength range by stimulated emission of radiation comprising a quantity of negative temperature material optically pumpable by light in a second predetermined wavelength range dispersed in a liquid, said material comprising small crystallites of negative temperature material and said liquid has an index of refraction substantially equal to that of said crystallites, means enclosing said liquid, means for circulating said liquid through said enclosing means, means for cooling said circulating liquid, said enclosing means having a window at least partially transparent to light in said first predetermined wavelength range, and a pumping light source directed at a portion of said enclosing means and emitting light in said second predetermined wavelength range, said portion of said enclosing means being substantially transparent to light of said second predetermined wavelength range.

No references cited.

JEWELL H. PEDERSEN, *Primary Examiner.*

R. L. WIBERT, *Assistant Examiner.*

Notice of Adverse Decision in Interference

In Interference No. 96,289 involving Patent No. 3,349,339, L. Thorington, OPTICALLY PUMPED LASER WITH CATHODO-LUMINESCENT PUMPING LIGHT SOURCE, final judgment adverse to the patentee was rendered June 11, 1970, as to claim 1.

[*Official Gazette November 17, 1970.*]